June 19, 1956     E. S. MARVIN ET AL     2,750,858
DOUBLE EXPOSURE PREVENTION DEVICE Filed Dec. 4, 1952     3 Sheets-Sheet 1

Edgar S. Marvin
Harold L. Malone
INVENTORS

BY
ATTORNEYS

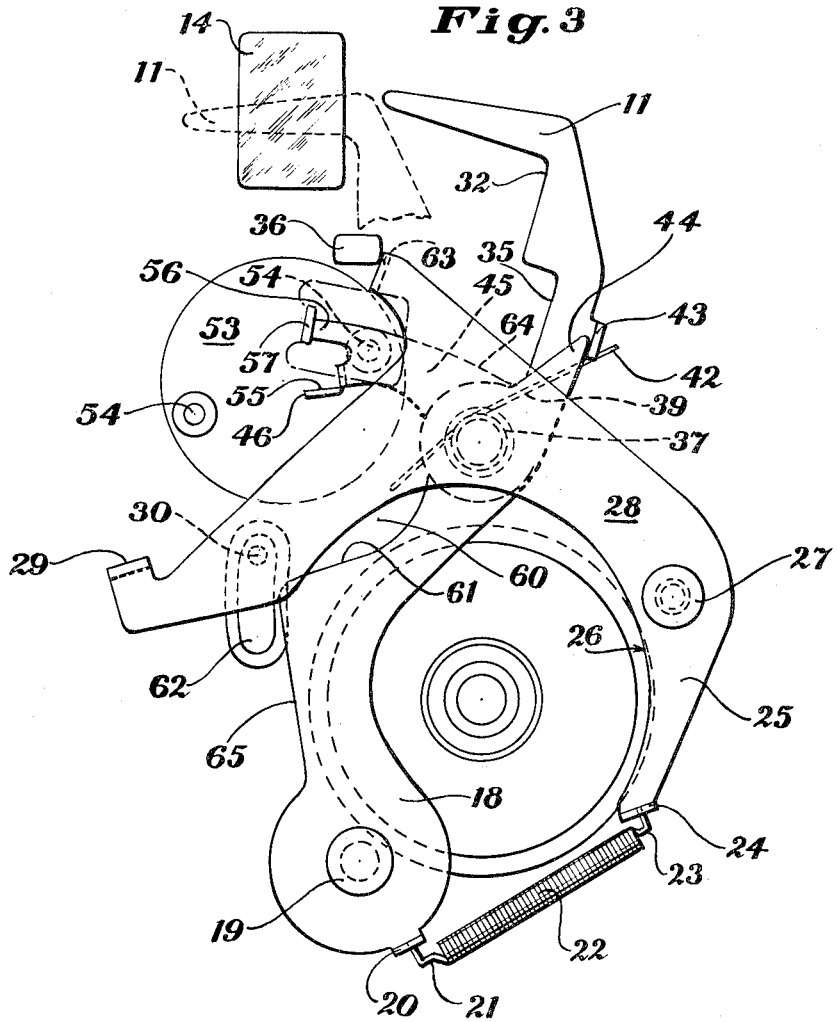

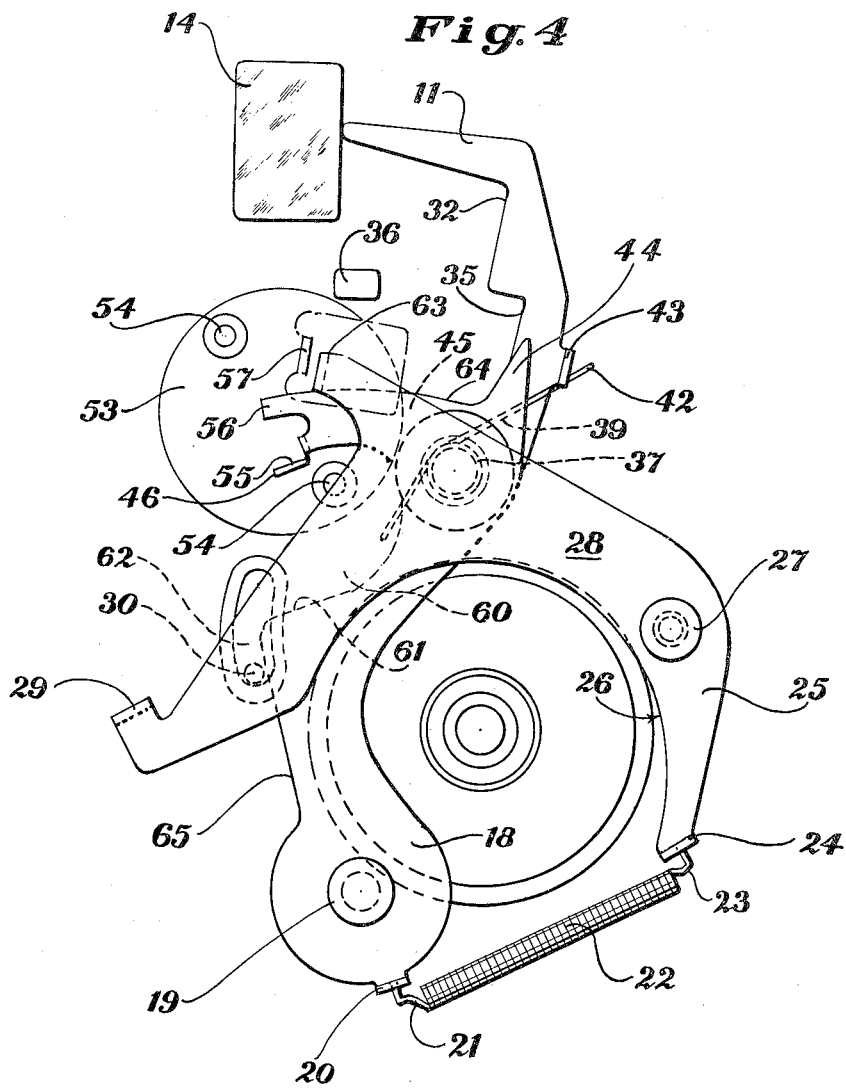

United States Patent Office 2,750,858
Patented June 19, 1956

2,750,858

DOUBLE EXPOSURE PREVENTION DEVICE

Edgar S. Marvin and Harold L. Malone, Rochester, N. Y., assignors to Eastman Kodak Company, Rochester, N. Y., a corporation of New Jersey Application December 4, 1952, Serial No. 323,968

6 Claims. (Cl. 95—31)

The present invention relates to photography, and more particularly to a camera of the roll-film type provided with an exposure indicating device.

When taking photographs with a camera which is not provided with a double exposure prevention arrangement, the operator is liable to forget whether he wound an exposed film area across the exposure aperture after the making of an exposure.

It has previously been proposed to provide a photographic camera with means for preventing actuation of a shutter releasing mechanism before the film is wound, and to prevent movement of the film winding mechanism when an exposure area of the film has been moved into picture taking position until the shutter releasing or actuating mechanism has been actuated.

Photographic cameras fitted with arrangements such as this, however, suffer from the disadvantage that they are expensive to manufacture, and require accurate assembly because of the latching devices employed.

It is an object of the present invention to provide an exposure indicating device which is moved automatically to an inoperative position when the film is wound.

Still another object of the invention is the provision of an exposure indicating means which is moved automatically to exposing position when the shutter is actuated to make an exposure.

And still another object of the invention is the provision of means controlled by the indicating member, when moved to indicating position, to lock the shutter against further actuation.

Yet another object of the invention is the provision of a releasable connection between the exposure indicating means and the film winding mechanism so that at least part of the operation of the latter serves to move the indicating member to an inoperative position, whereupon the indicating member is automatically and completely disconnected from the winding mechanism to permit free operation of the latter to complete the film winding operation.

A further object of the invention is the provision of an exposure indicating member which is simple in structure, relatively inexpensive to manufacture, easy to operate and positive in its results.

To these and other ends, the invention resides in certain improvements and combinations of parts, all as will be hereinafter more fully described, the novel features being pointed out in the claims at the end of the specification.

In the drawings:

Fig. 3 is a front elevation view of the indicating member and the control mechanism therefor, but showing the relation of the parts at the end of the film winding operation and before an exposure has been made; and Fig. 4 is a view similar to Fig. 3, but showing the relation of the parts during the operation of the shutter actuating mechanism to make an exposure.

Similar reference numerals throughout the various views indicate the same parts.

The present invention relates to a camera, preferably although not necessarily, of the roll-film type which is provided with an exposure indicating member or means to indicate when an exposure has been made so as to prevent the inadvertent winding up of unexposed image area or the making of a double exposure. Conveniently, the exposure indicating member may be so positioned as to obscure the field of view of a direct-vision view finder or other similar viewing devices carried by the camera. The indicating member is moved automatically into such field of view when the shutter is actuated to make an exposure, and is moved automatically out of the field of view when the exposed image area is wound. As the remaining parts of the camera may be of any suitable or well known construction and form no part of the present invention, only so much of the camera as is necessary, to a complete and full understanding of the present invention is illustrated or described.

Figure 1:
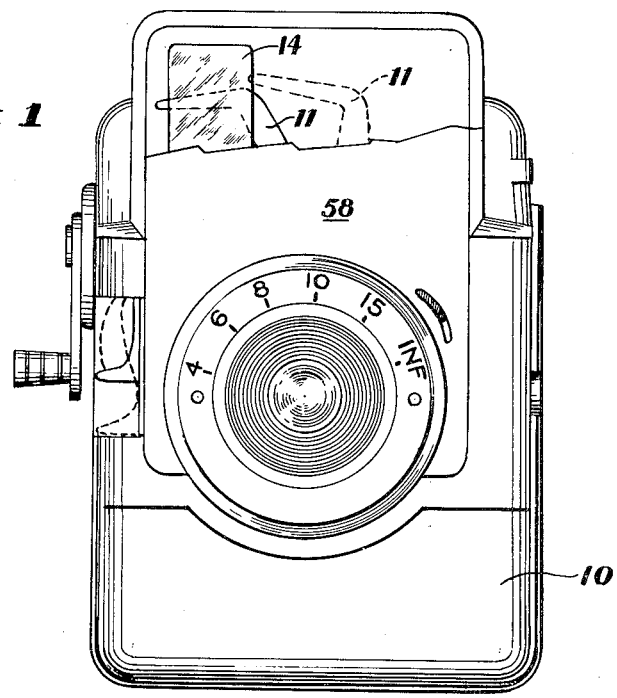
Fig. 1 is a front elevation view of a camera, with the front plate partly broken away, showing the relation thereto of an exposure indicating device constructed in accordance with the preferred embodiment of the invention.
Figure 2:
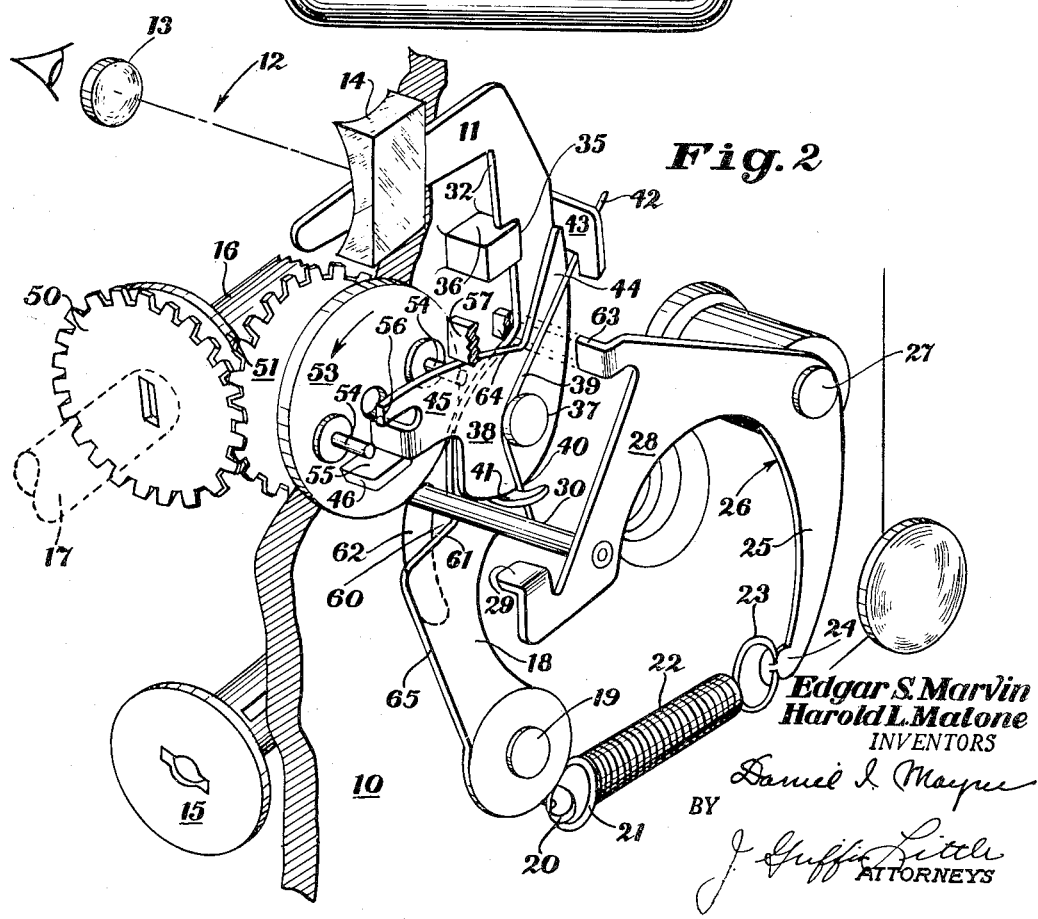
Fig. 2 is a front perspective view of the exposure indicating means or member of the present invention, showing the relation thereof to its supporting and actuating means, the parts being in the position occupied at the completion of an exposure and before the winding of the film.

In the preferred embodiment of the invention, the exposure indicating member is mounted on a camera body, a portion of which is shown at 10. The indicating member 11 is mounted for movement into and out of the field of a direct-vision view finder, broadly designated by the numeral 12 and having a back lens 13 and a front lens 14, as shown in Fig. 2. In its indicating position, a portion of the indicating member is positioned directly behind the front lens 14, as shown in Fig. 2 so that it may be viewed by the operator looking through the view finder, as is deemed apparent. After the shutter has been actuated to make an exposure, the member 11 is moved automatically into the field of the view finder 12, as shown in Fig. 2, so as to obscure the field of view thereof to indicate to the operator that an exposure has been made and that the next operation is to wind up the exposed image area. The unexposed film is wound from a supply spool 15, and passes over an exposure frame (not shown); and, after exposure, is wound up on a take up spool 16. The latter may be rotated to wind up the exposed film by any suitable means such, for example, as a winding knob (not shown) connected to shaft 17 which in turn is connected to spool 16.

The exposure indicating member 11 is carried on the upper end of a cantiliver flag lever 18, the lower end of which is rockably mounted at 19 on the camera body 10, only a portion of which is shown in the drawings. The lever 18 is formed with a depending lug 20 to which one end 21 of a coil spring 22 is connected. The other end 23 of spring 22 is connected to an ear 24 formed on the lower end of the arm 25 of a bell crank or shutter trigger lever, broadly indicated by the numeral 26 and rockably mounted at 27 on the camera body 10. The other arm 28 of the shutter trigger lever 26 is provided with a finger engaging portion 29, and also has connected thereto a trigger pin 30 which is connected in any suitable and well known manner to a shutter operating mechanism (not shown). As the shutter mechanism may be of any suitable construction and forms no part of the present invention, details thereof are neither illustrated nor described. Suffice it to say that when the finger portion 29 is pressed downwardly, the shutter trigger lever 26 is rocked in a counterclockwise direction above pivot 27 to move pin 30 to the position shown in Fig. 4 to operate the shutter to make an exposure. Upon completion of the exposure, the finger portion 29 is released, and the spring 22 serves automatically to rock the trigger lever 26 in a clockwise direction to rotate the parts to the position shown in Fig. 2.

It is apparent from an inspection of Figs. 2–4 that the spring 22 would tend to rock flag lever 18 in a counterclockwise direction about pivot 19 to shift the indicating member 11 into the field of view of the finder 12. When the member 11 has been moved into the field of view of the finder 12, an edge 35 of the flag lever will engage a forwardly extending boss 36 on the camera body 10 to limit the counterclockwise movement of the flag lever by spring 22 to maintain the member in proper indicating position, as is deemed apparent from inspection of Fig. 2.

The flag lever 18 has pivotally mounted thereon at 37 a bell crank or finger lever, broadly indicated by the numeral 38. A coil spring 39 is wrapped about pivot 37 and has one end 40 in engagement with a lug 41 carried by the finger lever 38 and the other end 42 engaging a forwardly extending ear 43 positioned on the flag lever 18 above the pivot 37 of the lever 38, as clearly illustrated in Figs. 2–4. The spring 39 is so wound that it tends to rock the finger lever 38 in a clockwise direction about pivot 37. To limit such rocking and to position the finger lever 38 relative to the flag lever 18, the vertical arm 44 of lever 38 is positioned to engage ear 43, as shown in Figs. 2–4. The other or horizontal arm 45 of the finger lever 38 has formed thereon an offset lug 46 of the shape best shown in Fig. 2.

After an exposure has been made, the parts are in a position illustrated in Fig. 2. It is obvious from inspection of this figure that the indicating member 11 could be moved out of the field of view of the finder 12 by rocking the flag lever 18 manually in a clockwise direction about its pivot 19. However, it is preferred to utilize the winding of the exposed film area to move the member 11 so that such winding will move the member 11 automatically from the indicating position shown in Fig. 2 to its inoperative position shown in Fig. 3 without any attention on the part of the operator, the advantages of which are deemed apparent. To this end, the flag lever 18 is connected to the film winding mechanism for at least a portion of the operation of the latter so that the winding mechanism will be effective to move or set the flag lever 18. After such moving or setting, the flag lever 18, as well as the finger lever 38, is automatically and completely disconnected from the film winding mechanism so as to permit complete winding up of the exposed image area. As the levers 18 and 38 are connected to the film winding mechanism only long enough to move or set the levers, such connection may be broadly considered as momentary.

In order that the winding of the exposed film area may be utilized to move or set the levers 18 and 38, the shaft 17 of the take-up spool 16 has fixedly mounted thereon a gear 50 which meshes with a gear 51 carried on a stub shaft, not shown. This stub shaft also has mounted thereon a drive plate 53 provided with a pair of forwardly extending pins 54 which rotated with plate 53 and in the path of the lug 46 on the arm 45 of the finger lever 38, as is deemed apparent from inspection of Fig. 2. The mechanism normally would operate satisfactorily with only one pin 54; but, in order to insure the complete withdrawal of the member 11 from the field of the view finder 12 before the finish of the winding operation, it is preferred to cause such withdrawal to be performed during the initial portion only of such winding. To secure this result, two such pins 54 are used so that only a partial rotation of plate 53 will be sufficient to bring one of the pins 54 into engagement with lug 46.

The plate 53 rotates in the direction indicated by the arrow Fig. 2, and when one of the pins 54 engages lug 46, the direction of force is such that the finger 38 is first rocked counterclockwise about its pivot 37 and relative to the flag lever 18. Such relative rotation of the lever 18 serves to wind up or tension spring 39. As the rotation of plate 53 is continued, a point is reached at which a component of the force applied by pin 54 to lug 46 is such as to rock the lever 38 and the lever 18 as a unit in a clockwise direction about pivot 19 to shift member 11 from the indicating position shown in Fig. 2 to the inoperative position shown in Fig. 3. Such clockwise rotation of the levers will serve to tension spring 22. Continued rotation of the plate 53 finally will cause the engaged pin 54 to slide along the top surface 55 of lug 46 and finally drop off the latter to disengage lever 38, and hence lever 18, automatically and completely from the film winding mechanism. Thus, the levers 18 and 38 are connected momentarily to the film winding mechanism so that the latter is operative to move or to set the levers, whereupon the levers are completely and automatically disconnected from the film winding mechanism. Also the lug 46 and pins 54 provide a clutch or disengagable connection between the levers 18 and 38 and the plate 53 and hence the film winding mechanism.

After the levers 18 and 38 have been thus disconnected from plate 53, the tensioned spring 39 will rock finger lever 38 clockwise relative to the flag lever 18 until arm 44 of the finger lever engages lug 43, of flag lever 18 which will limit further relative movement by the levers. At this time the levers are now in the same relative position as illustrated in Fig. 2. After the finger lever 38 has been disconnected from plate 53, the lever 38, as well as lever 18, is now free and the spring 22 will tend to rock the levers 18 and 38, as a unit, in a counterclockwise direction about pivot 19. However, the relative counterclockwise rotation of finger 38 relative to flag lever 18, upon disconnectoin of plate 53, will position a lug 56 on the arm 45 of the finger lever 38 in the path of a fixed stop 57 carried by and extending rearwardly from the front plate 58 of the camera. Now, when the tensioned spring 22 rocks the levers 18 and 38 as a unit in a counterclockwise direction about pivot 19, lug 56 will finally engage stop 57 to limit such movement and to retain the flag lever 18 in a position such that the member 11 is held out of the field of view of the finder 12. The parts are then in the full-line position illustrated in Fig. 3.

Referring again momentarily to Fig. 2, it is seen that the trigger or shutter actuating pin 30 is positioned in a recess 60 formed in the flag lever 18 so that the bottom edge 61 of the recess 60 is below and in the path of the pin 30. The edge 61 thus provides a blocking member or element which will effectively prevent downward movement of the pin 30 and hence the tripping of the trigger lever 26, as is deemed apparent from an inspection of Fig. 2. However, after the disengagement of the levers 18 and 38 from the film winding mechanism and the engagement of the lug 56 with stop 57, the blocking edge 61 is moved out of blocking relation with the shutter pin 30, as illustrated in Fig. 3. The result is that at the completion of the film winding operation, the exposure indicating member 11 is moved to an inoperative or non-indicating position, and the shutter tripping mechanism is released.

As the trigger lever 26 is now free, the finger portion 29 may be pressed downwardly to rock lever 26 counterclockwise about its pivot 27. Such rocking will cause pin 30 to move along slot 62 formed in body 10 and to trip or actuate the shutter to make an exposure. The lever 26 is provided with an extending arm 63 which is parallel to the trigger pin 30 which, when the parts are in a position illustrated in Fig 2, overlies and is spaced slightly above the upper surface or edge 64 of finger lever 38 Now, when lever 26 is rocked counterclockwise, as mentioned above, the arm 63 is moved downwardly and into engaging relation with surface 64. Such engagement will serve to rock the finger lever 38 about its pivot 37, and relative to the flag lever 18, to disengage the lug 56 from the stop 57 to free levers 18 and 38. The tensioned spring 22 will now tend to rock the freed levers 18 and 38 in a counterclockwise direction about pivot 19. It is to be noted, however, that when the trigger lever 26 has been rocked, the trigger pin 30 is moved downwardly along the slot 62. Therefore, when the spring 22 tends to rock the free levers counterclockwise about pivot 19, the pin 30 will have been moved a sufficient distance downwardly so as to be in the path of and to be engaged by the left edge 65 of the flag lever 18 to limit such counterclockwise movement thereof to hold the member 11 out of the field of view of the finder, all as illustrated in Fig. 4. Thus, the trigger pin 30 is moved into the path of the edge 65 slightly in advance of the engagement of the arm 63 with the upper surface 64 of the lever 38, the advantages of which are deemed apparent.

However, when the pin 30 reaches the bottom of the slot 62, the shutter has been tripped or actuated and exposure has been made. Thereupon, the portion 29 that may be released, and the spring 22 will rock the trigger lever 26 clockwise about its pivot 27 to return the pin 30 upwardly to a position at the top of slot 62. Such upward movement of pin 30 will move it out of blocking relation with the edge 65 and into horizontal alignment with the slot or recess 60 of the flag lever 18. As mentioned above, the lug 56 has been moved previously out of engagement with the stop 57 so that the flag lever is now free and will be rocked by means of spring 22 to the position illustrated in Fig. 2, at which time the member 11 will engage boss 36 to limit further rocking movement of the levers and to position member 11 in the field of view of the view finder 12. When this position is reached, the pin 30 is in the recess 60 and above the blocking edge 61 so that a second actuation of the shutter cannot be made until the film area has been wound as above described, by means of this arrangement a double exposure is originated.

From the above described, it is apparent that there are four position of the parts. The first position is at the end of the shutter actuate and before the film is wound, and is illustrated in Fig. 2. The second position is after the film has been wound and the lever is locked, but before the shutter is actuated, and this is illustrated in Fig. 3. The third position is when the levers have been unlocked, but held against return by the trigger pin 30 when in position to actuate or trip the shutter, this position being illustrated in Fig. 4. The fourth and final position is the return of the parts to the original position which is the same as in Fig. 2, after the completion of the shutter actuate to lock the shutter against further movement.

The present invention thus provides an exposure indicating member which is automatically moved to an indicating position upon actuation of the shutter so as to notify the operator that the next operation is to wind the exposed film area. Also, when the indicating member is moved to indicating position the shutter is automatically locked against further operation. The winding of the film is then utilized to connect momentarily the indicating member automatically to the film winding mechanism so that the member may be moved to an inoperative or non-indicating position. After the member has been so moved, it is completely and automatically disconnected from the film-winding mechanism. Such movement of the indicating member frees the shutter tripping or actuating mechanism so that the latter may be operated to make an exposure. The operating mechanism for the indicating member is simple, comprises few parts of rugged construction, is easy to operate and positive as to results.

While one embodiment of the invention has been disclosed, it is to be understood that the inventive idea may be carried out in a number of ways. This application, therefore, is not to be limited to the precise details disclosed, but is intended to cover all variations and modifications thereof falling within the scope of the appended claims.

We claim:

1. In a camera, the combination with a film feeding mechanism, a shutter actuating mechanism, of a flag lever rockably mounted on said camera, a finger lever pivotally mounted on said flag lever, an exposure indicating member carried by said flag lever and movable into and out of indicating position when said lever is rocked in opposite directions, a drive plate operatively connected to said feeding mechanism and actuated upon operation of said feeding mechanism, releasable clutch elements carried by said plate and said finger lever to connect the latter and said flag lever to said feeding mechanism to rock said flag and finger levers as a unit in one direction to shift said member out of indicating position, means on said camera positioned in the path of and adapted to be engaged by said finger lever to hold the latter and said flag lever in an inoperative position to retain said member out of exposure indicating position, means associated with said actuating mechanism adapted to engage said finger lever upon operation of said actuating mechanism to move said finger lever out of held relation with said finger lever holding means to release said finger lever, blocking means associated with said actuating mechanism movable upon operation of said actuating mechanism into the path of said flag lever to retain the latter in a position to hold said member out of indicating position, said blocking means being moved out of the path of said flag lever upon the completion of the operation of said actuating mechanism to free said flag lever, and means for rocking said flag lever in another direction to shift said member into indicating position.

2. In a camera, the combination with a film feeding mechanism, a shutter actuating mechanism, of a flag lever rockably mounted on said camera, a finger lever pivotally mounted on said flag lever, means connected to said finger lever and tending to pivot the latter in one direction relative to said flag lever, an indicating member carried by said flag lever and adapted to be moved into and out of indicating position when said flag lever is rocked in one direction on said camera, a drive plate operatively connected to and rotated when said feeding mechanism is operated, a releasable clutch connecting said plate to said finger lever during at least a portion of the feeding operation to rock said finger and flag levers as a unit on said camera to shift said member out of indicating position, said clutch being automatically disengaged when said member is moved out of said position to disconnect both of said levers from said feeding mechanism, a fixed stop on said camera positioned to engage said finger lever to hold said member out of said indicating position, means associated with said actuating mechanism and engaging said finger lever when said actuating mechanism is operated to make an exposure to disengage said finger lever from said stop, a blocking element associated with said actuating mechanism movable into the path of said flag lever to hold the latter against movement in another direction during the making of the exposure, said element being movable out of the path of said flag lever at the completion of said exposure to free said flag lever, and means to rock said flag and finger levers as a unit in another direction to shift said member back into indicating position indicate that an exposure has been made.

3. In a camera the combination with a film feeding mechanism, a shutter actuating mechanism, of a flag lever rockably mounted on said camera, a finger lever pivotally mounted on said flag lever, a spring connected to said finger lever and tending to pivot the latter in one direction relative to said flag lever, an exposure indicating member carried by said flag lever and movable into and out of exposure indicating position when said flag lever is rocked on said camera, a drive plate connected to and moved by said feeding mechanism when the latter is operated, cooperating releasable clutch elements carried by said finger lever and said plate so that movement of the latter by said feeding mechanism will engage said clutch elements first to pivot said finger lever in another direction relative to said flag lever to tension said spring and then to rock both of said levers as a unit to shift said member out of exposure indicating position, when said member is shifted out of said indicating position said clutch elements automatically releasing to disconnect said lever from said feeding mechanism, said disconnection enabling said tensioned spring to pivot said finger lever in said one direction relative flag lever, a fixed stop in said camera positioned in the path of said finger lever and engaged thereby to hold said member out of exposure indicating position, an arm connected to said actuating mechanism and overlying said finger lever so that movement of said actuating mechanism to make an exposure will shift said arm into engagement with said finger lever again to pivot the latter relative to said flag lever to disconnect said finger lever from said stop, a blocking element associated with said actuating mechanism and positionable in the path of said flag lever upon exposure-making movement of said actuating mechanism to hold said flag lever against movement in another direction to retain said member out of indicating position, the completion of the operation of said actuating mechanism serving to shift said element out of the path of said flag lever to free the latter, and spring means connected to said flag lever to rock the latter and said finger lever as a unit in another direction to shift said member into exposure indicating position.

4. In a camera the combination with a film feeding mechanism, a shutter actuating mechanism, of a flag lever rockably mounted on said camera, a finger lever pivotally mounted on said flag lever, a spring connected to said finger lever and tending to pivot the latter in one direction relative to said flag lever, an exposure indicating member carried by said flag lever and movable into and out of exposure indicating position when said flag lever is rocked on said camera, a drive plate connected to and moved by said feeding mechanism when the latter is operated, a drive pin carried by said drive plate, a lug on said finger lever positioned in the path of said drive pin so as to be engaged thereby when said plate is moved by said feeding mechanism, the engagement of said pin with said lug first serving to pivot said finger lever relative to said flag lever to tension said spring and then rock said finger and flag levers as a unit on said camera to move said member out of exposure indicating position, when said member is moved out of said indicating position said pin moving out of contact with said lug to disconnect said lever from said feeding mechanism, said disconnection enabling said tensioned spring to pivot said finger lever in said one direction relative to said flag lever, a fixed stop on said camera positioned in the path of said finger lever and engaged thereby to hold said member out of exposure indicating position, an arm connected to said actuating mechanism and overlying said finger lever so that movement of said actuating mechanism to make an exposure will shift said arm into engagement with said finger lever again to pivot the latter relative to said flag lever to disconnect said finger lever from said stop, a blocking element associated with said actuating mechanism and positionable in the path of said flag lever upon exposure-making movement of said actuating mechanism to hold said flag lever against movement in another direction to retain said member out of indicating position, the completion of the operation of said actuating mechanism serving to shift said element out of the path of said flag lever to free the latter, and spring means connected to said flag lever to rock the latter and said finger lever as a unit in another direction to shift said member into exposure indicating position.

5. In a camera, the combination with a film feeding mechanism, a shutter actuating mechanism, of a flag lever rockably mounted on said camera, a finger lever pivotally mounted on said flag lever, an exposure indicating member carried by said flag lever and movable into and out of indicating position when said lever is rocked in opposite directions, a drive plate operatively connected to said feeding mechanism and actuated upon operation of said feeding mechanism, releasable clutch elements carried by said plate and said finger lever to connect the latter and said flag lever to said feeding mechanism to rock said flag and finger levers as a unit in one direction to shift said member out of indicating position, means on said camera positioned in the path of and adapted to be engaged by said finger lever to hold the latter and said flag lever in an inoperative position to retain said member out of exposure indicating position, means associated with said actuating mechanism adapted to engage said finger lever upon operation of said actuating mechanism to move said finger lever out of held relation with said finger lever holding means to release said finger lever, blocking means associated with said actuating mechanism movable upon operation of said actuating mechanism into the path of said flag lever to retain the latter in a position to hold said member out of indicating position, said blocking means being moved out of the path of said flag lever upon the completion of the operation of said actuating mechanism to free said flag lever, means for rocking said flag lever in another direction to shift said member into indicating position, the rocking of said flag lever to shift said member into exposure indicating position serving to bring the clutch element on said finger lever into position to be engaged by the clutch element on said plate when said feeding mechanism is operated, and a second blocking means on said flag lever being movable into the path of said first blocking means when said flag lever is rocked in said other direction to lock said actuating mechanism against a second operation.

6. In a camera, the combination with a film feeding mechanism, a shutter actuating mechanism, of a flag lever rockably mounted on said camera, a finger lever pivotally mounted on said flag lever, a spring connected to said finger lever and tending to pivot the latter in one direction relative to said flag lever, an exposure indicating member carried by said flag lever and movable into and out of exposure indicating position when said flag lever is rocked on said camera, a drive plate connected to and moved by said feeding mechanism when the latter is operated, a drive pin carried by said drive plate, a lug on said finger lever positioned in the path of said drive pin so as to be engaged thereby when said plate is moved by said feeding mechanism, the engagement of said pin with said lug first serving to pivot said finger lever relative to said flag lever to tension said spring and then to rock said finger and flag levers as a unit on said camera to move said member out of exposure indicating position, when said member is moved out of said indicating position said pin moving out of contact with said lug to disconnect said lever from said feeding mechanism, said disconnection enabling said tensioned spring to pivot said finger lever in said one direction relative to said flag lever, a fixed stop on said camera positioned in the path of said finger lever and engaged thereby to hold said member out of exposure indicating position, an arm connected to said actuating mechanism and overlying said finger lever so that movement of said actuating mechanism to make an exposure will shift said arm into engagement with said finger lever again to pivot the latter relative to said flag lever to disconnect said finger lever from said stop, a blocking element associated with said actuating mechanism and positionable in the path of said flag lever upon exposure-making movement of said actuating mechanism to hold said flag lever against movement in another direction to retain said member out of indicating position, the completion of the operation of said actuating mechanism serving to shift said element out of the path of said flag lever to free the latter, spring means connected to said flag lever to rock the latter and said finger lever as a unit in another direction to shift said member into exposure indicating position, and a blocking shoulder formed on said flag lever and movable into the path of said blocking element when said flag member is moved in said other direction by said last-mentioned spring to prevent a second actuation of said actuation mechanism prior to the movement of said feeding mechanism.

References Cited in the file of this patent

UNITED STATES PATENTS

| | | |
|---|---|---|
| 1,200,174 | Dense | Oct. 3, 1916 |
| 1,253,077 | Mordaunt | Jan. 8, 1918 |
| 1,289,256 | Peterson | Dec. 31, 1918 |
| 1,321,868 | Weiss | Nov. 18, 1919 |
| 1,356,583 | Woodworth | Oct. 26, 1920 |
| 1,477,038 | Cubbage | Dec. 11, 1923 |
| 1,478,318 | Woodworth | Dec. 18, 1923 |
| 1,588,666 | Donchian | June 15, 1926 |
| 1,696,533 | Gage | Dec. 25, 1928 |
| 1,805,424 | Stankewitz | May 12, 1931 |
| 2,011,567 | Carpenter | Aug. 20, 1935 |
| 2,229,848 | Harter | Jan. 28, 1941 |
| 2,289,800 | Nagel | July 14, 1942 |
| 2,637,253 | Noack | May 5, 1953 |